United States Patent
Wu et al.

(10) Patent No.: US 12,101,259 B2
(45) Date of Patent: Sep. 24, 2024

(54) DATA TRANSMISSION CONTROL METHOD AND DEVICE, AND NON-TRANSITORY COMPUTER-READABLE MEDIUM

(71) Applicant: Lanto Electronic Limited, Kunshan (CN)

(72) Inventors: Lin Wu, Kunshan (CN); Yuss Mu, Kunshan (CN); Ling Zhang, Kunshan (CN); Peng Sun, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 410 days.

(21) Appl. No.: 17/462,407

(22) Filed: Aug. 31, 2021

(65) Prior Publication Data
US 2022/0231959 A1     Jul. 21, 2022

(30) Foreign Application Priority Data
Jan. 19, 2021 (CN) .......................... 202110067711.0

(51) Int. Cl.
| | | |
|---|---|---|
| G06F 3/00 | (2006.01) | |
| G06F 3/147 | (2006.01) | |
| H04L 47/36 | (2022.01) | |
| H04L 47/722 | (2022.01) | |

(52) U.S. Cl.
CPC ............ *H04L 47/365* (2013.01); *G06F 3/147* (2013.01); *H04L 47/722* (2013.01)

(58) Field of Classification Search
None
See application file for complete search history.

(56) References Cited

U.S. PATENT DOCUMENTS

| 10,116,325 B2 * | 10/2018 | Sekiguchi | ............... H03M 7/30 |
| 10,217,400 B2 | 2/2019 | Staudenmaier et al. | |

(Continued)

FOREIGN PATENT DOCUMENTS

| CN | 106648513 A | 5/2017 |
| CN | 107566972 A | 1/2018 |

(Continued)

OTHER PUBLICATIONS www.wikipedia.com, Serial Peripheral Interface Bus, Feb. 2010, p. 1-8 (Year: 2010).*

*Primary Examiner* — Henry Tsai
*Assistant Examiner* — Dean Phan
(74) *Attorney, Agent, or Firm* — Birch, Stewart, Kolasch & Birch, LLP

(57) ABSTRACT

Provided are a data transmission control method and device and a non-transitory computer-readable medium. The data transmission control method includes: determining a multiple and a remainder according to a total data size of to-be-transmitted data and a set byte size, where the multiple is equal to a quotient obtained by dividing the total data size by the set byte size, and the remainder is equal to a remainder obtained by dividing the total data size by the set byte size; sequentially transmitting data whose size is the set byte size multiplied by the multiple in the to-be-transmitted data by transmitting data of the set byte size each time; and in response to the remainder being not zero, transmitting remaining data whose size is the remainder in the to-be-transmitted data.

18 Claims, 10 Drawing Sheets

Determine a multiple and a remainder according to a total data size of to-be-transmitted data and a set byte size, wherein the multiple is equal to a quotient obtained by dividing the total data size by the set byte size, and the remainder is equal to a remainder obtained by dividing the total data size by the set byte size — S110

Sequentially transmit data whose size is the set byte size multiplied by the multiple in the to-be-transmitted data by transmitting data of the set byte size each time — S120

In response to the remainder being not zero, transmit remaining data whose size is the remainder in the to-be-transmitted data — S130

(56) References Cited

U.S. PATENT DOCUMENTS

| | | | |
|---|---|---|---|
| 2011/0208899 A1* | 8/2011 | Uchida | G06F 12/0246 |
| | | | 711/E12.008 |
| 2011/0219194 A1* | 9/2011 | Okada | G06F 12/08 |
| | | | 711/137 |
| 2016/0014347 A1* | 1/2016 | Van Eynde | G11B 27/031 |
| | | | 386/280 |
| 2017/0280006 A1* | 9/2017 | Eguchi | G06F 3/0683 |
| 2018/0052632 A1* | 2/2018 | Takada | G06F 3/0661 |

FOREIGN PATENT DOCUMENTS

| | | |
|---|---|---|
| CN | 109640302 A | 4/2019 |
| CN | 109643516 A | 4/2019 |

* cited by examiner

DATA TRANSMISSION CONTROL METHOD AND DEVICE, AND NON-TRANSITORY COMPUTER-READABLE MEDIUM

CROSS-REFERENCES TO RELATED APPLICATIONS

This application claims priority to a Chinese patent application No. 202110067711.0 filed on Jan. 19, 2021, the disclosure of which is incorporated herein by reference in its entirety.

TECHNICAL FIELD

The present disclosure relates to the field of data processing technology and, in particular, to a data transmission control method and device, and a non-transitory computer-readable medium.

BACKGROUND

At present, the conventional electronic cigarette (also known as e-cigarette) on the market is not equipped with a display screen, and as a result, users cannot directly view the current usage data of the e-cigarette.

In some existing hand-held electronic devices whose main purpose is not to display information, a display screen would be mounted on these hand-held electronic devices to enable users to directly view usage data or related information of the electronic device. Such a hand-held electronic device whose main purpose is not to display information, for example, is the e-cigarette, and some existing e-cigarettes are equipped with a display so that users can visually check the current status of the e-cigarette. The conventional display screen algorithm is to traverse each pixel point and refresh and display separately each pixel point. If a to-be-displayed picture is relatively large, a control chip transmits image data bit by bit to the display screen so that the number of transmissions is large. For example, for one picture having a size of 74088 bytes, a serial peripheral interface (SPI) needs to be driven to perform transmission 74088 times. Each transmission requires processes such as protocol preparation, start, and end, which takes a long time, thereby causing slow picture display or slow picture refresh speed and low display efficiency.

SUMMARY

Embodiments of the present disclosure provide a data transmission control method and device to improve the data transmission efficiency, shorten the data transmission time, and meet screen refresh speed requirements.

In a first aspect, the embodiments of the present disclosure provide a data transmission control method. The method includes the steps described below.

A multiple and a remainder are determined according to a total data size of to-be-transmitted data and a set byte size, where the multiple is equal to a quotient obtained by dividing the total data size by the set byte size, and the remainder is equal to a remainder obtained by dividing the total data size by the set byte size.

Data whose size is the set byte size multiplied by the multiple in the to-be-transmitted data is sequentially transmitted by transmitting data of the set byte size each time.

In response to the remainder being not zero, the remaining data whose size is the remainder in the to-be-transmitted data is transmitted.

Furthermore, before the multiple and the remainder are determined according to the total data size of the to-be-transmitted data and the set byte size, the method further includes the step described below.

The set byte size is determined according to a protocol type of an input source of the to-be-transmitted data.

Furthermore, before the data whose size is the set byte size multiplied by the multiple in the to-be-transmitted data is sequentially transmitted by transmitting the data of the set byte size each time, the method further includes the steps described below.

A buffer whose size is the set byte size is set in a memory.

The buffer is connected to a memory of a reception module through a direct memory access controller.

A transmission interface is enabled.

Accordingly, the step in which the data whose size is the set byte size multiplied by the multiple in the to-be-transmitted data is sequentially transmitted by transmitting the data of the set byte size each time includes the steps described below.

The buffer is updated for times of the multiple in real time in a manner of sequentially storing data whose size is the set byte size multiplied by the multiple in the to-be-transmitted data into the buffer by copying the data of the set byte size to the buffer each time.

The data in buffer updated for times of the multiple is written into the memory of the reception module through the direct memory access controller by writing the data of the set byte size in the buffer into the memory of the reception module through the direct memory access controller each time.

The step in which, in response to the remainder being not zero, the remaining data whose size is the remainder in the to-be-transmitted data is transmitted includes the steps described below.

In response to the remainder being not zero, the remaining data whose size is the remainder in the to-be-transmitted data is copied to the buffer.

The remaining data whose size is the remainder in the buffer is written into the memory of the reception module through the direct memory access controller.

Furthermore, the transmission interface includes at least one of: a serial peripheral interface (SPI) or an inter-integrated circuit (I2C) bus.

Furthermore, before the multiple and the remainder are determined according to the total data size of the to-be-transmitted data and the set byte size, the method further includes the step described below.

A to-be-superimposed picture is superimposed to a background picture to synthesize a to-be-displayed picture, which includes the steps described below.

A color value of each first pixel point in the to-be-superimposed picture is judged in sequence.

In response to a color value of a first pixel point being a set color value, the color value of the first pixel point is replaced with a color value of a second pixel point corresponding to a position of the first pixel point in the background picture.

In response to the color value of the first pixel point being not the set color value, the color value of the first pixel point is retained.

The to-be-displayed picture is used as the to-be-transmitted data.

In a second aspect, the embodiments of the present disclosure further provide a data transmission control device. The device includes a first determination unit, an equivalence transmission unit, and a remaining transmission unit.

The first determination unit is configured to determine a multiple and a remainder according to a total data size of to-be-transmitted data and a set byte size, where the multiple is equal to a quotient obtained by dividing the total data size by the set byte size, and the remainder is equal to a remainder obtained by dividing the total data size by the set byte size.

The equivalence transmission unit is configured to sequentially transmit data whose size is the set byte size multiplied by the multiple in the to-be-transmitted data by transmitting data of the set byte size each time.

The remaining transmission unit is configured to, in response to the remainder being not zero, transmit the remaining data whose size is the remainder in the to-be-transmitted data.

Furthermore, the data transmission control device further includes a second determination unit.

The second determination unit is configured to determine the set byte size according to a protocol type of an input source of the to-be-transmitted data.

Furthermore, the data transmission control device further includes a buffer setting unit, a connection unit, and an enabling unit.

The buffer setting unit is configured to set a buffer whose size is the set byte size in a memory.

The connection unit is configured to connect the buffer to a memory of a reception module through a direct memory access controller.

The enabling unit is configured to enable a transmission interface.

The equivalence transmission unit includes an update sub-unit and a successive writing sub-unit.

The update sub-unit is configured to update the buffer for times of the multiple in real time in a manner of sequentially storing data whose size is the set byte size multiplied by the multiple in the to-be-transmitted data into the buffer by copying the data of the set byte size to the buffer each time.

The successive writing sub-unit is configured to write the data in buffer updated for times of the multiple into the memory of the reception module through the direct memory access controller by writing the data of the set byte size in the buffer into the memory of the reception module through the direct memory access controller each time.

The remaining transmission unit includes a copying sub-unit and a remaining writing sub-unit.

The copying sub-unit is configured to, in response to the remainder being not zero, copy the remaining data whose size is the remainder in the to-be-transmitted data to the buffer.

The remaining writing sub-unit is configured to write the remaining data whose size is the remainder in the buffer into the memory of the reception module through the direct memory access controller.

Furthermore, the transmission interface includes at least one of: an SPI or an I2C bus.

Furthermore, the data transmission control device further includes a picture synthesizing module.

The picture synthesizing module is configured to, before the multiple and the remainder are determined according to the total data size of the to-be-transmitted data and the set byte size, superimpose a to-be-superimposed picture to a background picture to synthesize a to-be-displayed picture.

The picture synthesizing module includes a pixel point traversal unit, a replacement unit, a retaining unit, and a data generation unit.

The pixel point traversal unit is configured to judge a color value of each first pixel point in the to-be-superimposed picture in sequence.

The replacement unit is configured to, in response to a color value of a first pixel point being a set color value, replace the color value of the first pixel point with a color value of a second pixel point corresponding to a position of the first pixel point in the background picture.

The retaining unit is configured to, in response to the color value of the first pixel point being not the set color value, retain the color value of the first pixel point.

The data generation unit is configured to use the to-be-displayed picture as the to-be-transmitted data.

In the technical solution of the embodiments of the present disclosure, a multiple and a remainder are determined according to a total data size of to-be-transmitted data and a set byte size, where the multiple is equal to a quotient obtained by dividing the total data size by the set byte size, and the remainder is equal to a remainder obtained by dividing the total data size by the set byte size; data whose size is the set byte size multiplied by the multiple in the to-be-transmitted data is sequentially transmitted by transmitting data of the set byte size each time; and in response to the remainder being not zero, remaining data whose size is the remainder in the to-be-transmitted data is transmitted. In this way, the equivalent amount of data is continuously transmitted for multiple times so that the size of the transmission packet transmitted each time is consistent, which avoids frequent unpacking, packing, and checking processing and saves the time of unpacking and packing, and finally the remaining data whose size is less than the set byte size is transmitted. Therefore, the transmission times are reduced, and the time consumed in the process such as protocol preparation is reduced, thereby improving the data transmission efficiency, shortening the data transmission time, and improving the screen refresh speed.

DETAILED DESCRIPTION

Figure 1:
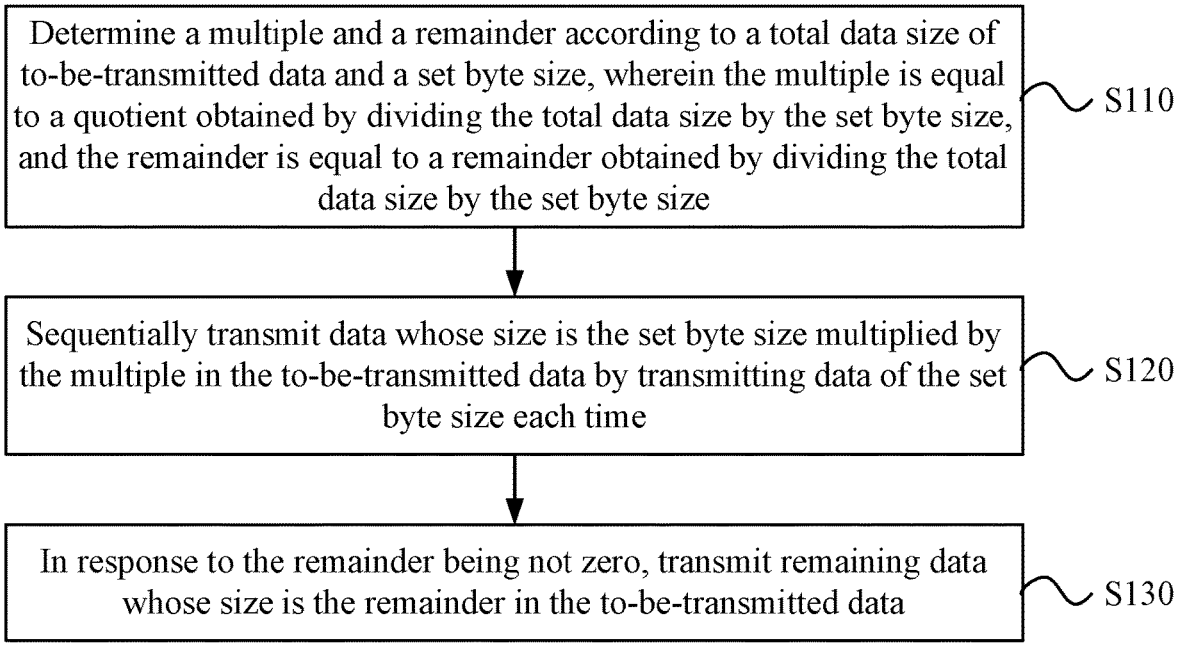
FIG. 1 is a flowchart of a data transmission control method according to an embodiment of the present disclosure.

Hereinafter the present disclosure will be further described in detail in conjunction with the drawings and embodiments. It is to be understood that the specific embodiments set forth below are intended to illustrate and not to limit the present disclosure. Additionally, it is to be noted that, for ease of description, only part, not all, of the structures related to the present disclosure are illustrated in the drawings.

An embodiment of the present disclosure provides a data transmission control method. FIG. 1 is a flowchart of a data transmission control method according to an embodiment of the present disclosure. The method may be performed by a data transmission control device. The device may be implemented by software and/or hardware and may be integrated in a control chip having a data transmission control function, such as a control chip of a hand-held electronic device. The data transmission control method specifically includes steps 110, 120, and 130.

In step 110, a multiple and a remainder are determined according to a total data size of to-be-transmitted data and a set byte size, where the multiple is equal to a quotient obtained by dividing the total data size by the set byte size, and the remainder is equal to a remainder obtained by dividing the total data size by the set byte size.

The to-be-transmitted data may be image data. The set byte size may include 256 bytes or 512 bytes. The set byte size may be set as needed, which is not limited in the embodiments of the present disclosure.

It is to be noted that Q/N=M . . . K, where the total data size is Q, the set byte size is N, the multiple is M, and the remainder is K, and Q=N×M+K. The multiplier may be calculated by the shifting algorithm and other algorithms. The remainder K may be calculated by performing an algorithm such as an AND operation on Q and a hexadecimal number 0x00FF. Exemplarily, when Q is a decimal number 43248 and the set byte size N is a decimal number 256, then M is a decimal number 168, and K is a decimal number 240, where the units may be bytes.

In step 120, data whose size is the set byte size multiplied by the multiple in the to-be-transmitted data is sequentially transmitted by transmitting data of the set byte size each time.

Data of (N×M) bytes in the to-be-transmitted data is sequentially transmitted to a reception module by transmitting data of N bytes each time, that is, the transmission is performed for M times. In other words, M target transmission packets whose size is the set byte size are sequentially transmitted. The equivalent amount (that is, N bytes) of data is transmitted each time so that the size of the transmission packet transmitted each time is consistent, which avoids frequent unpacking, packing, and checking processing, saves the time of unpacking and packing, reduces the transmission times, and reduces the time consumed in the process such as protocol preparation, thereby improving the data transmission efficiency, shortening the data transmission time, and improving the screen refresh speed. The set byte size may be a multiple of 256, and then the refresh speed can reach a multiple of 256 or above.

In step 130, in response to the remainder being not zero, the remaining data whose size is the remainder in the to-be-transmitted data is transmitted.

After the data of (N×M) bytes in the to-be-transmitted data is sequentially transmitted to the reception module, the remaining data of K bytes in the to-be-transmitted data is transmitted to the reception module, and in this way, the to-be-transmitted data whose total data amount is Q bytes is transmitted to the reception module. If the remainder is zero, there is no need to perform step 130.

In the technical solution of the embodiment, a multiple and a remainder are determined according to a total data size of to-be-transmitted data and a set byte size, where the multiple is equal to a quotient obtained by dividing the total data size by the set byte size, and the remainder is equal to a remainder obtained by dividing the total data size by the set byte size; data whose size is the set byte size multiplied by the multiple in the to-be-transmitted data is sequentially transmitted by transmitting data of the set byte size each time; and in response to the remainder being not zero, remaining data whose size is the remainder in the to-be-transmitted data is transmitted. In this way, the equivalent amount of data is continuously transmitted for multiple times so that the size of the transmission packet transmitted each time is consistent, which avoids frequent unpacking, packing, and checking processing and saves the time of unpacking and packing, and finally the remaining data whose size is less than the set byte size is transmitted. Therefore, the transmission times are reduced, and the time consumed in the process such as protocol preparation is reduced, thereby improving the data transmission efficiency, shortening the data transmission time, and improving the screen refresh speed.

Figure 2:
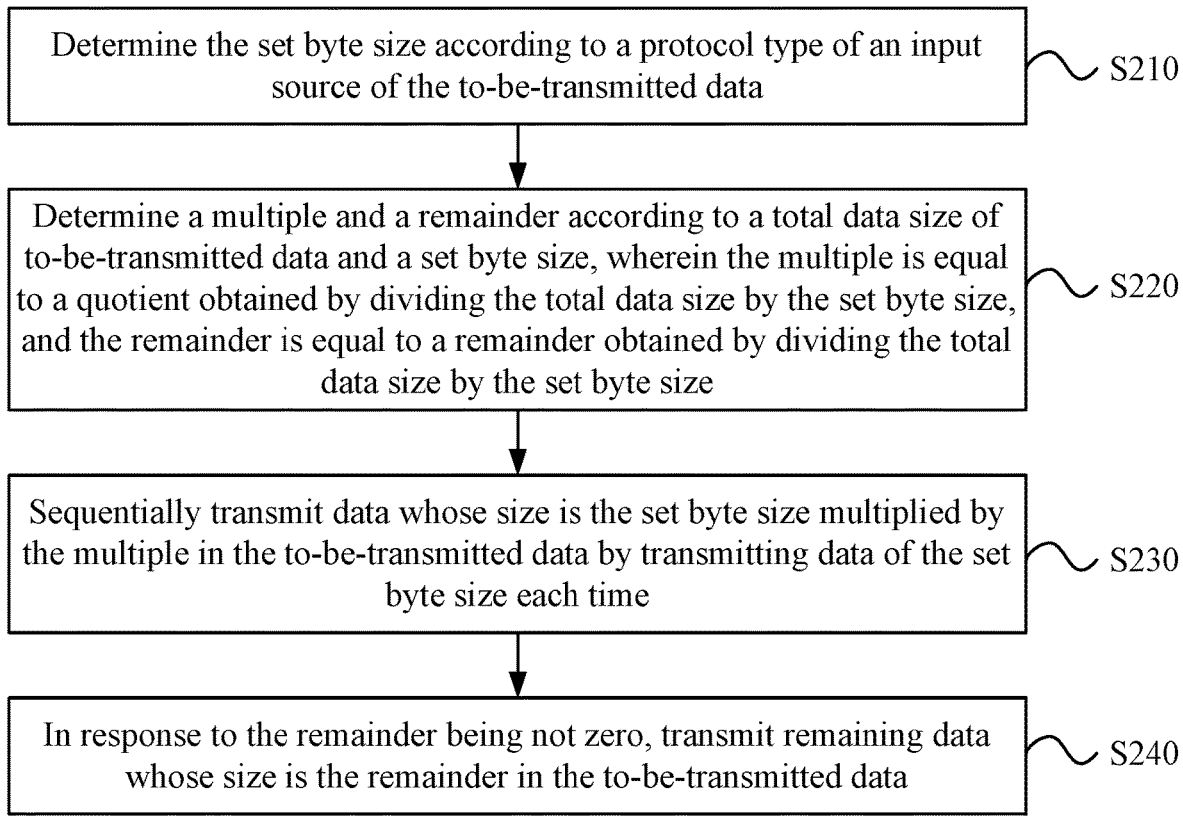
FIG. 2 is a flowchart of another data transmission control method according to an embodiment of the present disclosure.

An embodiment of the present disclosure provides another data transmission control method. FIG. 2 is a flowchart of another data transmission control method according to an embodiment of the present disclosure. The present embodiment is optimized on the basis of the above-mentioned embodiment and provides a method of determining the set byte size. On the basis of the above-mentioned embodiment, the data transmission control method includes steps 210, 220, 230, and 240.

In step 210, the set byte size is determined according to a protocol type of an input source of the to-be-transmitted data.

The input source may be a source of the to-be-transmitted data. As the input sources are different, the size and format of the to-be-transmitted data packets are different. The maximum transmission units (MTUs) of the protocol types of different input sources are different, and then the set byte size may be different. Optionally, the protocol type of the input source includes at least one of: a Bluetooth protocol, a Universal Serial Bus (USB) protocol, or a flash memory (Flash) protocol. The correspondence between the set byte size and the protocol type of the input source may be pre-established for the determination of the set byte size according to the protocol type of the input source of the to-be-transmitted data and the correspondence between the set byte size and the protocol type of the input source.

Figure 3:
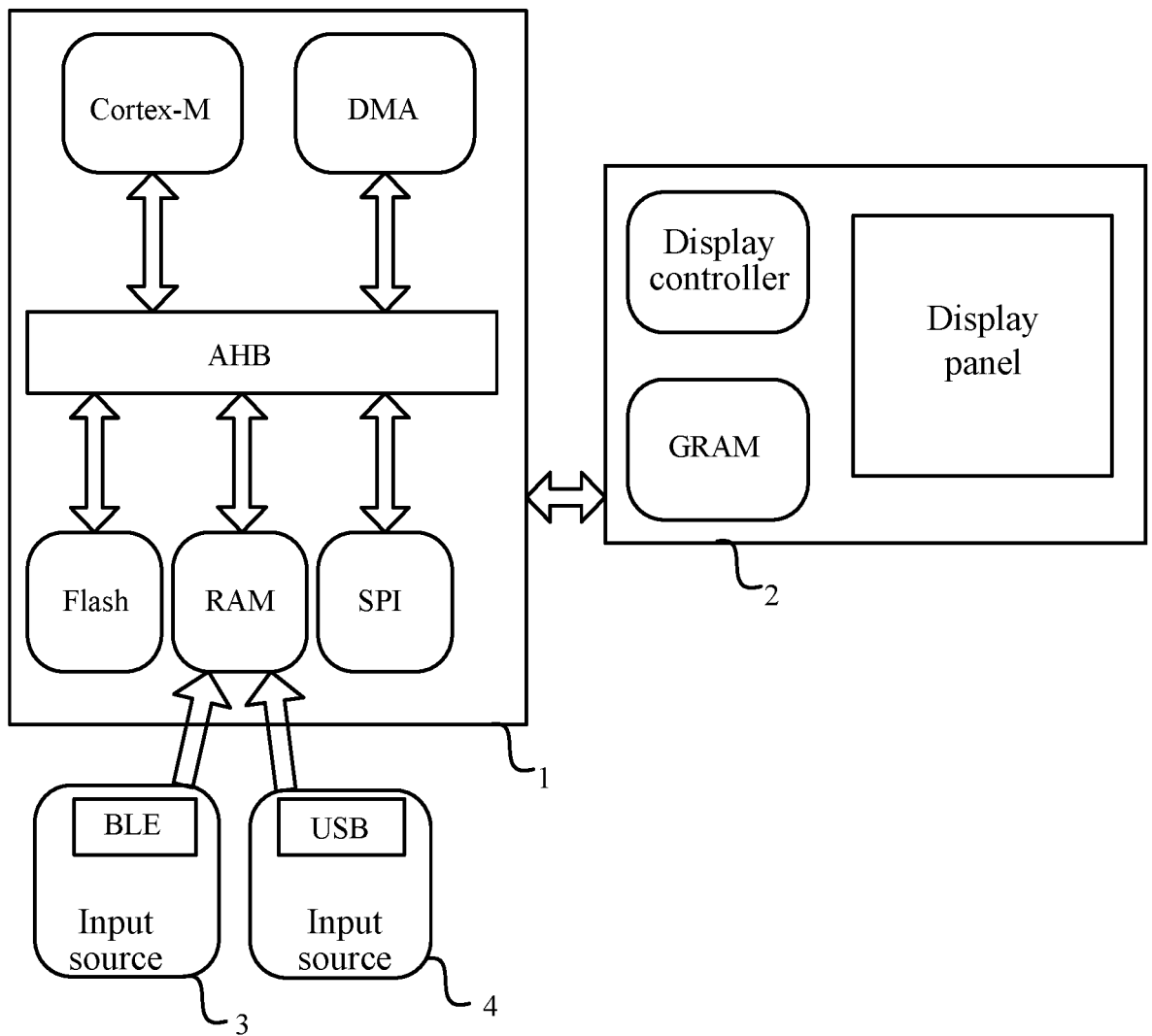
FIG. 3 is a schematic diagram of an application scenario according to an embodiment of the present disclosure.

FIG. 3 is a schematic diagram of an application scenario according to an embodiment of the present disclosure. The application scenario is, for example, but not limited to, the application in the hand-held electronic device whose main purpose is not to display information but which is equipped with a display screen, for example, such a hand-held electronic device is an e-cigarette equipped with a control chip 1 and a display screen 2. The microcontroller Cortex-M in the control chip 1 may be used for performing the data transmission control method provided by the present embodiment of the present disclosure. The input source 3 may be provided with a Bluetooth (BLE). The input source 3 may transmit to-be-transmitted data to the control chip 1 through the BLE, and then the control chip 1 transmits the to-be-transmitted data to the display screen 2. The input source 4 may be provided with a USB. The input source 4 may transmit to-be-transmitted data to the control chip 1 through the USB, and then the control chip 1 transmits the to-be-transmitted data to the display screen 2. The input source may also be the flash memory (Flash) in the control chip 1. The control chip 1 transmits the to-be-transmitted data in the Flash to the display screen 2. The input source unpacks picture data and sequentially transmits the unpacked packets (that is, transmission units) to the control chip 1. The control chip 1 receives the unpacked packets, combines the unpacked packets and puts them into the random access memory (RAM) of the control chip 1, and then transmits them to the display screen 2.

Optionally, if the protocol type of the input source of the to-be-transmitted data is Bluetooth BLE4.0 whose MTU is 23 bytes and the set byte size is 256 bytes, transmission packets received from the input source may be combined into several target transmission packets whose size is the set byte size and then the target transmission packets are transmitted sequentially to ensure that the transmission packets at each stage are consistent in size, thereby saving the time for unpacking and packing, reducing the number of transmissions, and reducing the time consumed in the process such as protocol preparation. Optionally, if the protocol type of the input source of the to-be-transmitted data is Bluetooth BLE4.1 whose MTU is 241 bytes and the set byte size is 256 bytes, transmission packets received from the input source may be combined into several target transmission packets whose size is the set byte size and then the target transmission packets are transmitted sequentially to ensure that the transmission packets at each stage are consistent in size, thereby saving the time for unpacking and packing, reducing the number of transmissions, and reducing the time consumed in the process such as protocol preparation. Optionally, if the protocol type of the input source of the to-be-transmitted data is Bluetooth BLE4.2 whose MTU is 512 bytes and the set byte size is 512 bytes, transmission packets received from the input source may be combined into several target transmission packets whose size is the set byte size and then the target transmission packets are transmitted sequentially to ensure that the transmission packets at each stage are consistent in size, thereby saving the time for unpacking and packing, reducing the number of transmissions, and reducing the time consumed in the process such as protocol preparation. Optionally, if the protocol type of the input source of the to-be-transmitted data is the Flash protocol and the set byte size is 256 bytes, transmission packets received from the input source may be combined into several target transmission packets whose size is the set byte size and then the target transmission packets are transmitted sequentially to ensure that the transmission packets at each stage are consistent in size, thereby saving the time for unpacking and packing, reducing the number of transmissions, and reducing the time consumed in the process such as protocol preparation.

In step 220, a multiple and a remainder are determined according to a total data size of to-be-transmitted data and the set byte size, where the multiple is equal to a quotient obtained by dividing the total data size by the set byte size, and the remainder is equal to a remainder obtained by dividing the total data size by the set byte size.

In step 230, data whose size is the set byte size multiplied by the multiple in the to-be-transmitted data is sequentially transmitted by transmitting data of the set byte size each time.

In step 240, in response to the remainder being not zero, the remaining data whose size is the remainder in the to-be-transmitted data is transmitted.

Figure 4:
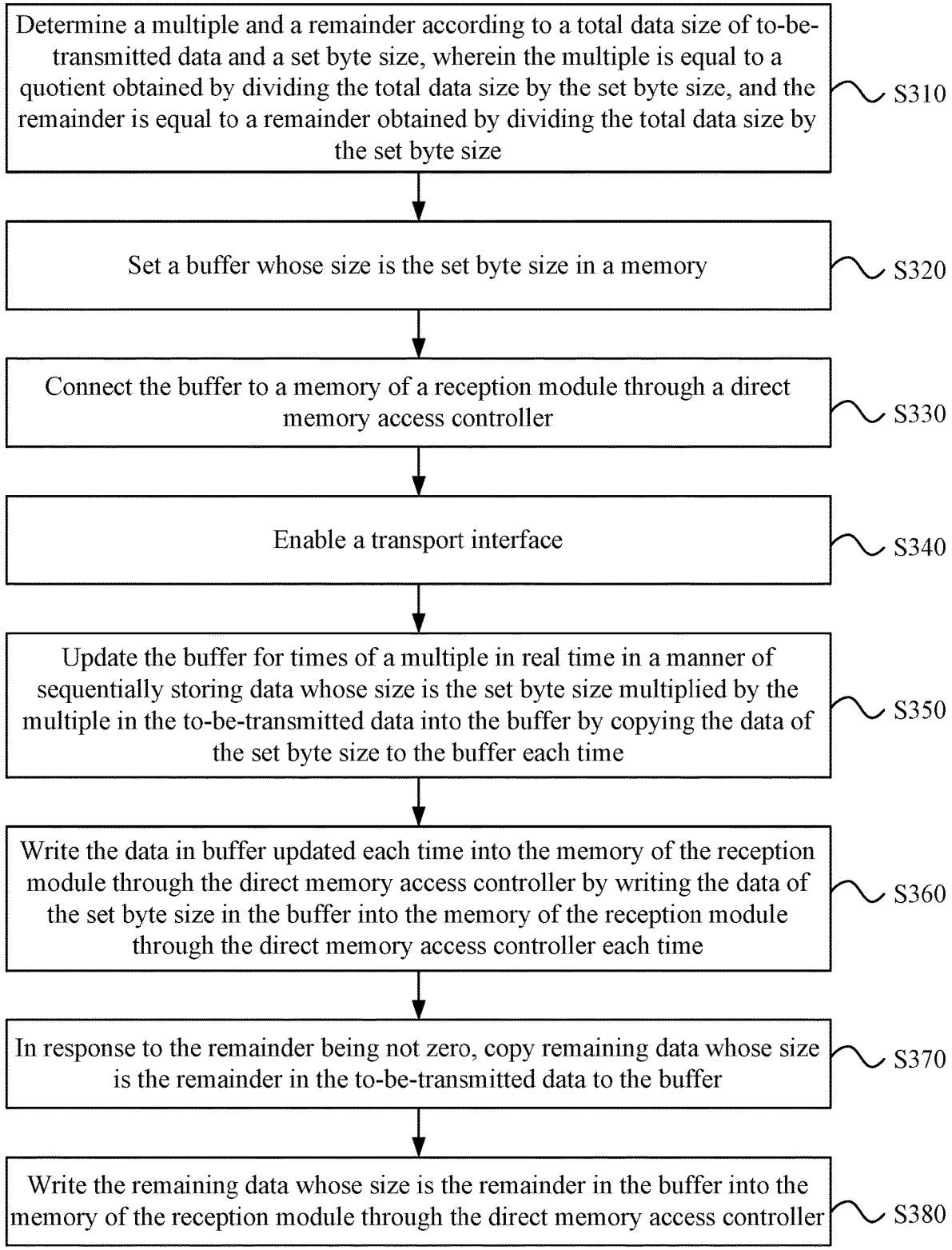
FIG. 4 is a flowchart of another data transmission control method according to an embodiment of the present disclosure.

An embodiment of the present disclosure provides another data transmission control method. FIG. 4 is a flowchart of another data transmission control method according to an embodiment of the present disclosure. The present embodiment is optimized on the basis of the above-mentioned embodiments and provides a transmission method based on a direct memory access controller. On the basis of the above-mentioned embodiment, the data transmission control method includes steps 310 to 380.

In step 310, a multiple and a remainder are determined according to a total data size of to-be-transmitted data and the set byte size, where the multiple is equal to a quotient obtained by dividing the total data size by the set byte size, and the remainder is equal to a remainder obtained by dividing the total data size by the set byte size.

In step 320, a buffer whose size is the set byte size is set in a memory.

With reference to FIG. 3, a buffer whose size is the set byte size may be set in the RAM in the control chip 1, and the data in the buffer is transmitted as a customized data packet. The buffer is used for storing data for a short period.

In step 330, the buffer is connected to a memory of a reception module through a direct memory access controller.

The direct memory access (DMA) controller is used for providing high speed data transmission between a peripheral and a memory or between a memory and another memory. The reception module may be a display screen. The display screen may be a liquid crystal display (LCD) screen or an organic light-emitting diode (OLED) display screen. With reference to FIG. 3, the buffer is connected to the memory of the display screen 2, that is, Graphics Random (GRAM), through the direct memory access (DMA) controller. The microcontroller Cortex-M, the direct memory access controller, the flash memory (Flash), the memory RAM, and the serial peripheral interface (SPI) in the control chip 1 may be connected to each other through an advanced high-performance bus (AHB). The display controller in the display screen 2 refreshes the memory GRAM for display.

In step 340, a transmission interface is enabled.

Optionally, the transmission interface includes at least one of: an SPI or an I2C bus. Exemplarily, with reference to FIG. 3, after the serial peripheral interface (SPI) is enabled, the data is transmitted through the SPI, and the data transmission is controlled by using the DMA controller. In this process, a small number of resources of the microcontroller Cortex-M (also called CPU) are occupied, thereby avoiding a case in which the CPU cannot respond to other events in the process of displaying a picture because CPU resources are exclusively occupied when the data is transmitted through the SPI only.

For example, the e-cigarette is equipped with a display screen so that users can visually check the current status of the e-cigarette. The display screen and the control chip in the e-cigarette communicate with each other through SPI and I2C protocols or other protocols. The SPI is used for transmitting display data. The SPI is a high-speed, full-duplex, synchronous communication bus and performs transmission through four lines, that is, SDI (data input), SDO (data output), SCLK (clock), and CS (Chip Select, slave device enable signals, controlled by the master device). The I2C bus performs transmission through two lines, that is, SDA (serial data line) and SCL (serial clock line), and the main advantages of the I2C bus are simplicity, effectiveness, low power consumption, and strong anti-interference.

In step 350, the buffer is updated for times of the multiple in real time in a manner of sequentially storing data whose size is the set byte size multiplied by the multiple in the to-be-transmitted data into the buffer by copying the data of the set byte size to the buffer each time.

The buffer is updated for times of the multiple in real time in a manner of sequentially storing data of (N×M) bytes in the to-be-transmitted data into the buffer by copying the data of N bytes to the buffer each time. After the data of N bytes is copied to the buffer, the data of N bytes in the buffer is written into the memory of the reception module through the direct memory access controller.

In step 360, the data in buffer updated for times of the multiple is written into the memory of the reception module through the direct memory access controller by writing the data of the set byte size in the buffer into the memory of the reception module through the direct memory access controller each time. In some embodiments, the data in buffer updated for times of the multiple is written into the memory of the reception module through the transmission interface by the direct memory access controller. In some embodiments, the data in buffer updated each time is sequentially written into the memory of the reception module through the direct memory access controller.

The data in buffer updated for times of the multiple is written into the memory of the reception module through the direct memory access controller by writing the data of N bytes in the buffer into the memory of the reception module through the direct memory access controller each time. After the data of N bytes in the buffer is written into the memory of the reception module through the direct memory access controller for certain times, if there is uncopied data in the data of (N×M) bytes in the to-be-transmitted data, data of N bytes in the uncopied data is copied to the buffer until there is no uncopied data in the data of (N×M) bytes in the to-be-transmitted data.

In step 370, in response to the remainder being not zero, the remaining data whose size is the remainder in the to-be-transmitted data is copied to the buffer.

If the remainder is not zero, the remaining data of K bytes in the to-be-transmitted data is copied to the buffer.

In step 380, the remaining data whose size is the remainder in the buffer is written into the memory of the reception module through the direct memory access controller.

The remaining data of K bytes in the buffer is written into the memory of the reception module through the direct memory access controller. If the remainder is zero, there is no need to perform steps 370 and 380.

Figure 5:
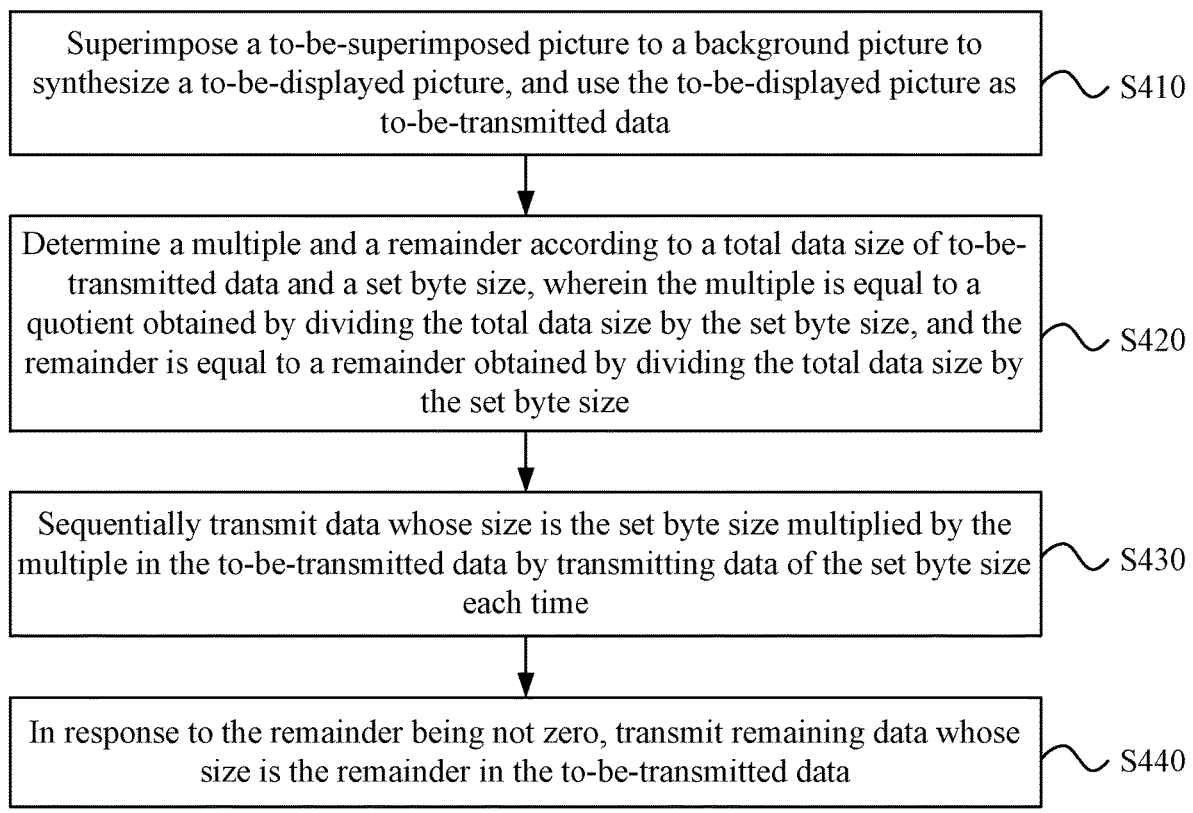
FIG. 5 is a flowchart of another data transmission control method according to an embodiment of the present disclosure.

An embodiment of the present disclosure provides another data transmission control method. FIG. 5 is a flowchart of another data transmission control method according to an embodiment of the present disclosure. On the basis of the above-mentioned embodiment, the data transmission control method includes steps 410, 420, 430, and 440.

In step 410, a to-be-superimposed picture is superimposed to a background picture to synthesize a to-be-displayed picture, where the to-be-displayed picture is used as the to-be-transmitted data.

Figure 6:
FIG. 6 is a schematic diagram of a to-be-superimposed picture according to an embodiment of the present disclosure.
Figure 7:
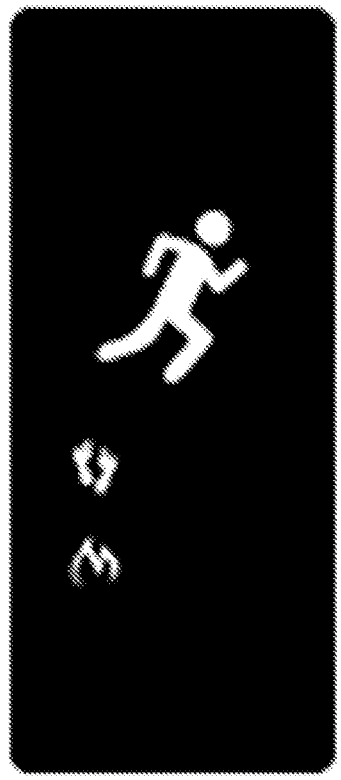
FIG. 7 is a schematic diagram of a background picture according to an embodiment of the present disclosure.
Figure 8:
FIG. 8 is a schematic diagram of a to-be-displayed picture synthesized according to an embodiment of the present disclosure.

The to-be-superimposed picture includes at least two colors, including an original background color and a color corresponding to display information. The display information may include at least one of number information or text information corresponding to functions such as time display, charging display, data statistics, and the like of the e-cigarette. The original background color of the to-be-superimposed picture is single and not aesthetically pleasing. The background picture may include graphics, etc. FIG. 6 is a schematic diagram of a to-be-superimposed picture according to an embodiment of the present disclosure, and FIG. 6 illustrates a case in which the original background color of the to-be-superimposed picture is pure black. FIG. 7 is a schematic diagram of a background picture according to an embodiment of the present disclosure. FIG. 8 is a schematic diagram of a to-be-displayed picture synthesized according to an embodiment of the present disclosure. As shown in FIGS. 6 to 8, the to-be-superimposed picture is superimposed to the background picture, which is equivalent to replacing pixel points of the original background color in the to-be-superimposed picture with pixel points at the corresponding positions in the background picture, or equivalent to replacing pixel points in the background picture that are not in the original background color with pixel points at the corresponding positions in the to-be-superimposed picture.

In step 420, a multiple and a remainder are determined according to a total data size of to-be-transmitted data and the set byte size, where the multiple is equal to a quotient obtained by dividing the total data size by the set byte size, and the remainder is equal to a remainder obtained by dividing the total data size by the set byte size.

In step 430, data whose size is the set byte size multiplied by the multiple in the to-be-transmitted data is sequentially transmitted by transmitting data of the set byte size each time.

In step 440, in response to the remainder being not zero, the remaining data whose size is the remainder in the to-be-transmitted data is transmitted.

Figure 9:
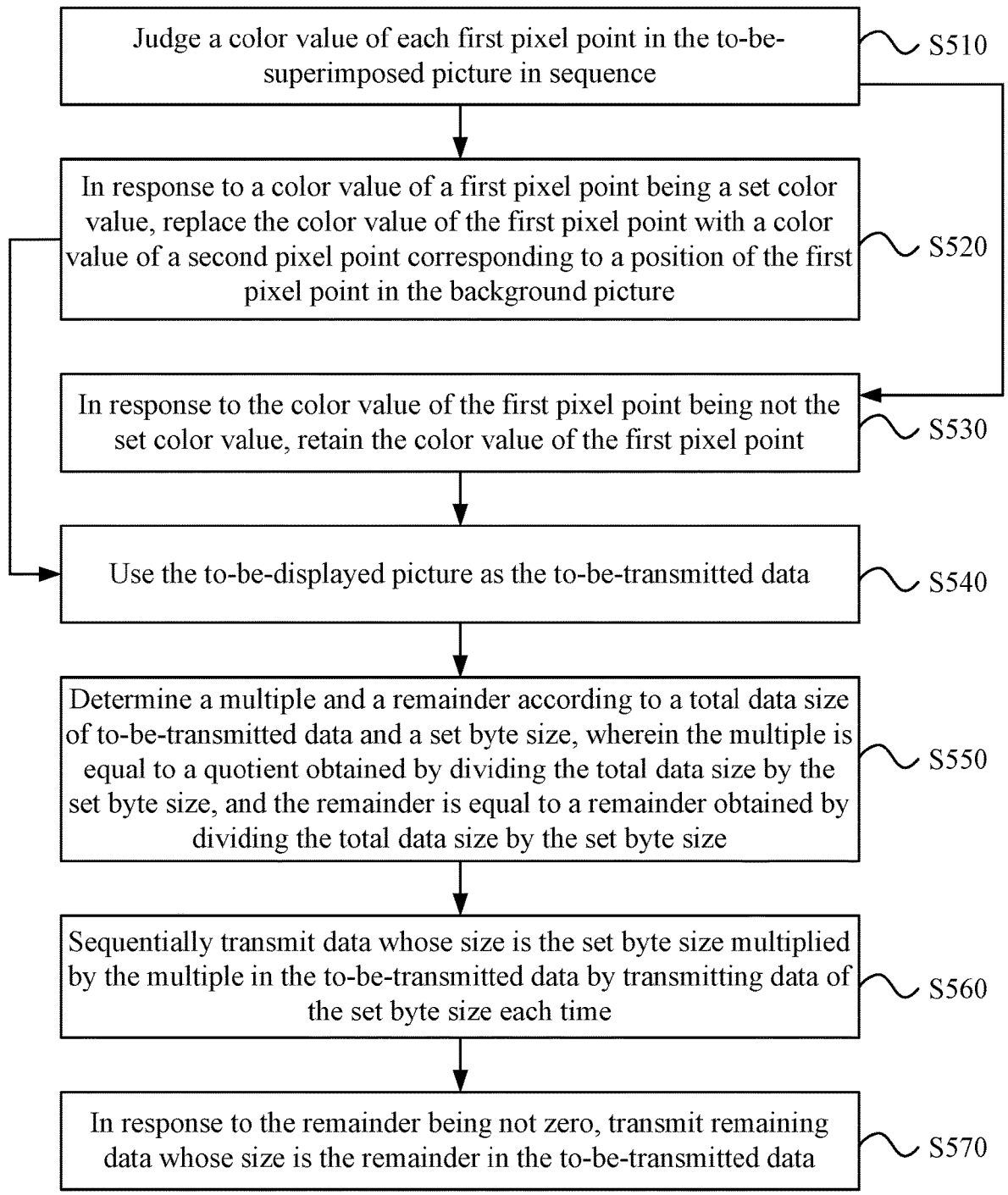
FIG. 9 is a flowchart of another data transmission control method according to an embodiment of the present disclosure.

An embodiment of the present disclosure provides another data transmission control method. FIG. 9 is a flowchart of another data transmission control method according to an embodiment of the present disclosure. In the embodiment, the to-be-superimposed picture includes a plurality of first pixel points, and the background picture includes a plurality of second pixel points. On the basis of the above-mentioned embodiment, the data transmission control method includes steps 510 to 570.

In step 510, a color value of each first pixel point in the to-be-superimposed picture is judged in sequence.

Exemplarily, the color value of each first pixel point may be represented by data of 2 bytes, that is, the color value is represented by data of 16 bits, where the first 5 bits represent red, the middle 5 bits represent green, and the last 6 bits represent blue.

In step 520, in response to a color value of a first pixel point being a set color value, the color value of the first pixel point is replaced with a color value of a second pixel point corresponding to a position of the first pixel point in the background picture.

The set color value may, but is not limited to, be black. The background picture may include a plurality of second pixel points. The positions of the first pixel points and the positions of the second pixel points are in one-to-one correspondence. If the color value of one first pixel point is the set color value, it indicates that this first pixel point is the original background color of the to-be-superimposed picture, like the black area shown in FIG. 6. The color value of this first pixel point is replaced with a color value of a second pixel point corresponding to a position of this first pixel point in the background picture, and the color value of the second pixel point corresponding to the position of this first pixel point in the background picture is used as a color value corresponding to the position of this first pixel point in the synthesized to-be-displayed picture. Exemplarily, if the color value of a current first pixel point is 0X0000, which means that the current first pixel point is pure black, the color value of a second pixel point corresponding to the current first pixel point in the background picture is replaced with the current pure black, and the color value of the corresponding second pixel point in the background picture is added to the to-be-transmitted data (that is, the array of display data).

In step 530, in response to the color value of the first pixel point being not the set color value, the color value of the first pixel point is retained.

If the color value of one first pixel point is not the set color value, for example, first pixel points corresponding to numbers "8726" and "412" in FIG. 6, it indicates that this first pixel point is not the original background color of the to-be-superimposed picture but the color corresponding to display information. At this point, the color value of this first pixel point is retained as a color value corresponding to the position of this first pixel point in the synthesized to-be-displayed picture. Exemplarily, if the color value of a current first pixel point is not 0X0000, which means that the current first pixel point is not pure black, the color value of the current first pixel point is added to the to-be-transmitted data (that is, the array of display data).

In step 540, the to-be-displayed picture is used as the to-be-transmitted data.

The to-be-transmitted data is transmitted to be displayed in the display screen. Through the above-mentioned steps, the to-be-superimposed picture is subjected to transparent color processing to meet the interface display requirements.

In step 550, a multiple and a remainder are determined according to a total data size of to-be-transmitted data and the set byte size, where the multiple is equal to a quotient obtained by dividing the total data size by the set byte size, and the remainder is equal to a remainder obtained by dividing the total data size by the set byte size.

In step 560, data whose size is the set byte size multiplied by the multiple in the to-be-transmitted data is sequentially transmitted by transmitting data of the set byte size each time.

In step 570, in response to the remainder being not zero, the remaining data whose size is the remainder in the to-be-transmitted data is transmitted.

An embodiment of the present disclosure provides a data transmission control device.

Figure 10:
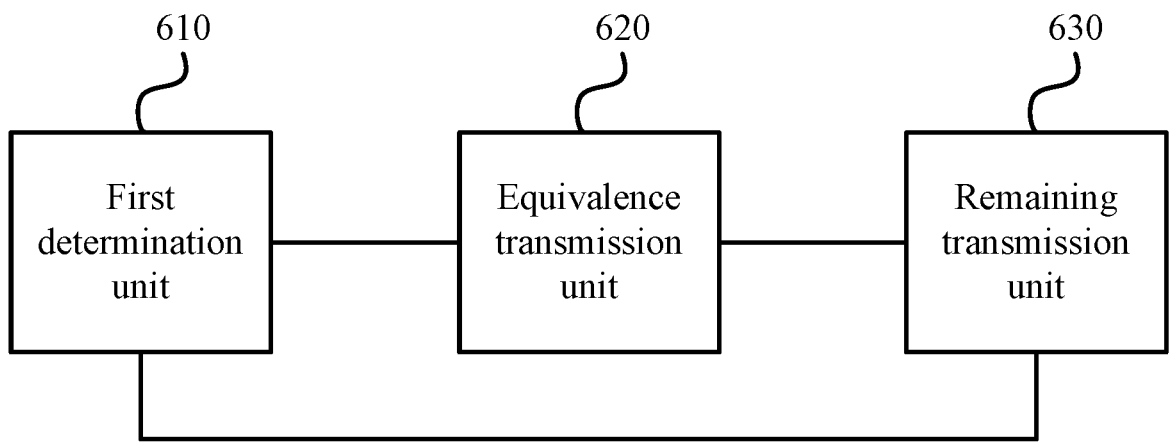
FIG. 10 is a structural diagram of a data transmission control device according to an embodiment of the present disclosure.

FIG. 10 is a structural diagram of a data transmission control device according to an embodiment of the present disclosure. The device is suitable for executing the data transmission control method provided by the embodiments of the present disclosure. On the basis of the above-mentioned embodiments, the data transmission control device includes a first determination unit 610, an equivalence transmission unit 620, and a remaining transmission unit 630.

The first determination unit 610 is configured to determine a multiple and a remainder according to a total data size of to-be-transmitted data and a set byte size, where the multiple is equal to a quotient obtained by dividing the total data size by the set byte size, and the remainder is equal to a remainder obtained by dividing the total data size by the set byte size. The equivalence transmission unit 620 is configured to sequentially transmit data whose size is the set byte size multiplied by the multiple in the to-be-transmitted data by transmitting data of the set byte size each time. The remaining transmission unit 630 is configured to, in response to the remainder being not zero, transmit the remaining data whose size is the remainder in the to-be-transmitted data.

The data transmission control device provided by the embodiment of the present disclosure can execute the data transmission control method provided by the embodiments of the present disclosure. Therefore, the data transmission control device provided by the embodiment of the present disclosure also has the beneficial effects described in the above-mentioned embodiments, and details are not repeated herein.

Figure 11:
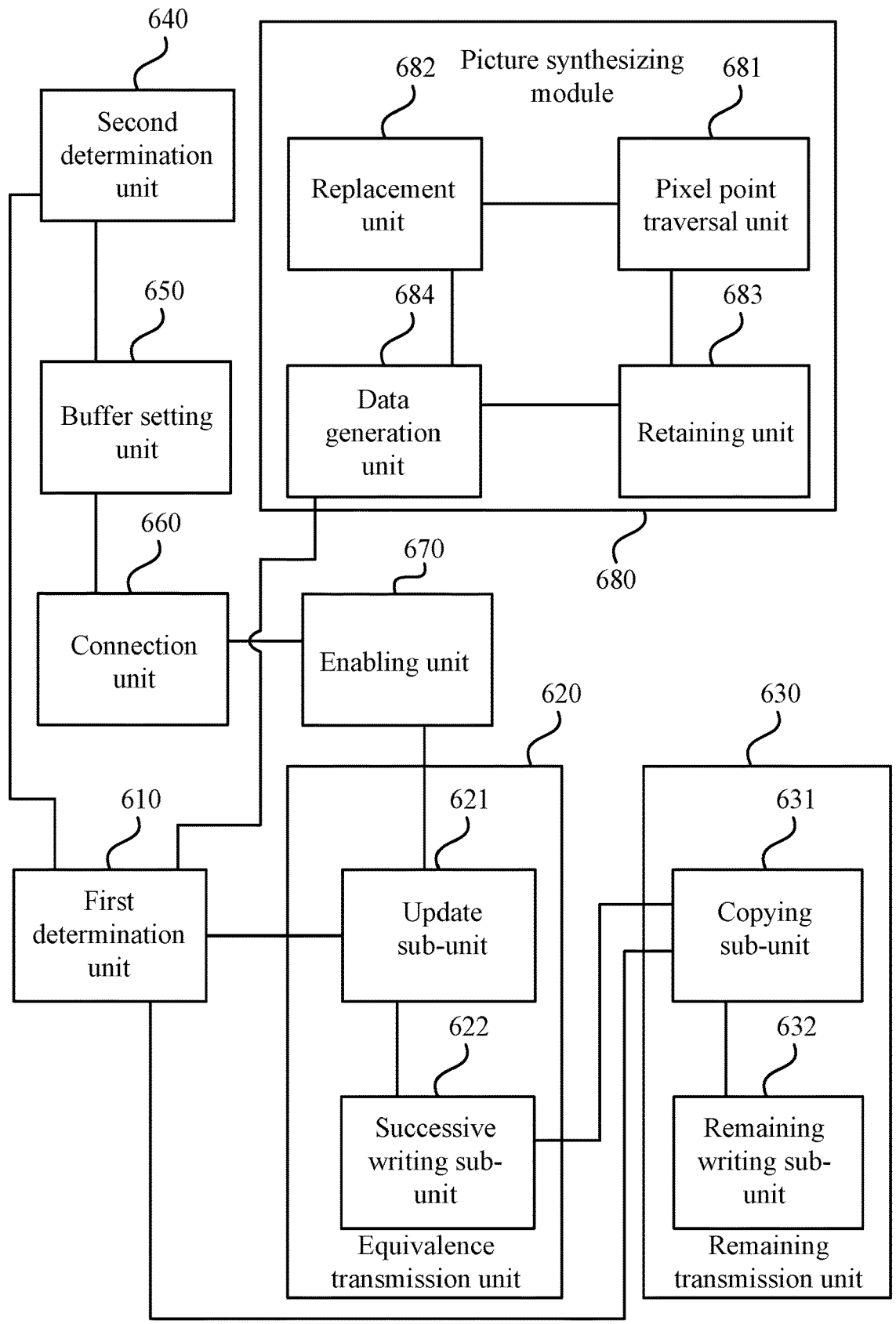
FIG. 11 is a structural diagram of another data transmission control device according to an embodiment of the present disclosure.

Optionally, on the basis of the above-mentioned embodiment, FIG. 11 is a structural diagram of another data transmission control device according to an embodiment of the present disclosure. The transmission control device further includes a second determination unit 640, which is configured to determine the set byte size according to a protocol type of an input source of the to-be-transmitted data.

Optionally, on the basis of the above-mentioned embodiments, with continued reference to FIG. 11, the data transmission control device further includes a buffer setting unit 650, a connection unit 660, and an enabling unit 670.

The buffer setting unit 650 is configured to set a buffer whose size is the set byte size in a memory. The connection unit 660 is configured to connect the buffer to a memory of a reception module through a direct memory access controller. The enabling unit 670 is configured to enable a transmission interface.

Optionally, on the basis of the above-mentioned embodiments, with continued reference to FIG. 11, The equivalence transmission unit 620 includes an update sub-unit 621 and a successive writing sub-unit 622. The update sub-unit 621 is configured to update the buffer for times of the multiple in real time in a manner of sequentially storing data whose size is the set byte size multiplied by the multiple in the to-be-transmitted data into the buffer by copying the data of the set byte size to the buffer each time. The successive writing sub-unit 622 is configured to write the data in buffer updated for times of the multiple into the memory of the reception module through the direct memory access controller by writing the data of the set byte size in the buffer into the memory of the reception module through the direct memory access controller each time.

Optionally, on the basis of the above-mentioned embodiments, with continued reference to FIG. 11, the remaining transmission unit 630 further includes a copying sub-unit 631 and a remaining writing sub-unit 632.

The copying sub-unit 631 is configured to, in response to the remainder being not zero, copy the remaining data whose size is the remainder in the to-be-transmitted data to the buffer. The remaining writing sub-unit 632 is configured to write the remaining data whose size is the remainder in the buffer into the memory of the reception module through the direct memory access controller.

Optionally, the transmission interface includes at least one of: an SPI or an I2C bus.

Optionally, on the basis of the above-mentioned embodiments, with continued reference to FIG. 11, the data transmission control device further includes a picture synthesizing module 680, which is configured to, before the multiple and the remainder are determined according to the total data size of the to-be-transmitted data and the set byte size, superimpose a to-be-superimposed picture to a background picture to synthesize a to-be-displayed picture.

Optionally, on the basis of the above-mentioned embodiment, with continued reference to FIG. 11, the picture synthesizing module 680 includes a pixel point traversal unit 681, a replacement unit 682, a retaining unit 683, and a data generation unit 684.

The pixel point traversal unit 681 is configured to judge a color value of each first pixel point in the to-be-superimposed picture in sequence. The replacement unit 682 is configured to, in response to a color value of a first pixel point being a set color value, replace the color value of the first pixel point with a color value of a second pixel point corresponding to a position of the first pixel point in the background picture. The retaining unit 683 is configured to, in response to the color value of the first pixel point being not the set color value, retain the color value of the first pixel point. The data generation unit 684 is configured to use the to-be-displayed picture as the to-be-transmitted data.

The above-mentioned data transmission control device can execute the data transmission control method provided by any one of the embodiments of the present disclosure and has functional modules and beneficial effects corresponding to the execution method.

Figure 12:
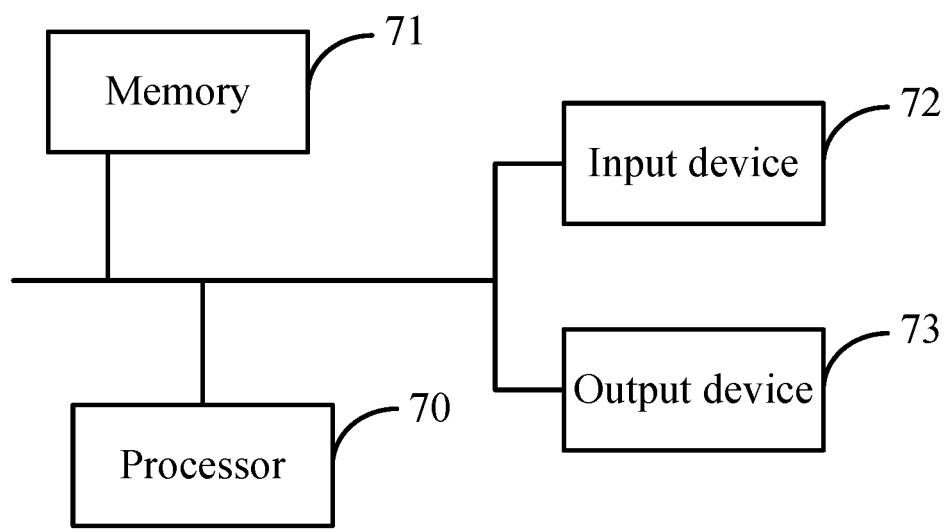
FIG. 12 is a structural diagram of a control device according to an embodiment of the present disclosure.

FIG. 12 is a structural diagram of a control device according to an embodiment of the present disclosure. As shown in FIG. 12, the control device includes a processor 70, a memory 71, an input device 72, and an output device 73. The number of processors 70 in the control device may be one or more, and FIG. 12 is illustrated by using an example of one processor 70. The processor 70, the memory 71, the input device 72, and the output device 73 in the control device may be connected to each other through a bus or in other ways, and FIG. 12 is illustrated by using an example in which the above components in the control device are connected through a bus.

The memory 71, as a computer-readable storage medium, may be configured to store software programs and computer-executable programs and modules such as program instructions/modules corresponding to the data transmission control method in the embodiments of the present disclosure (for example, the data transmission control device includes a first determination unit 610, an equivalence transmission unit 620, and a remaining transmission unit 630). The processor 70 executes software programs, instructions and modules stored in the memory 71 to execute various function applications and data processing of the control device, that is, to implement the data transmission control method described above.

The memory 71 may mainly include a program storage area and a data storage area. The program storage area may store an operating system and an application program required by at least one function. The data storage area may store data created based on the use of the terminal. Furthermore, the memory 71 may include a high speed random access memory, and may also include a nonvolatile memory such as at least one disk memory, flash memory or another nonvolatile solid state memory. In some examples, the memory 71 may further include memories located remotely relative to the processor 70, and these remote memories may be connected to the control device via networks. The examples of the preceding network include, but are not limited to, the Internet, an intranet, a local area network, a mobile communication network, and a combination thereof.

The input device 72 may be configured to receive inputted digital or character information and generate key signal input related to user settings and function control of the control device, and for example, may include an external Flash and the like. The output device 73 may include display devices such as a display screen.

An embodiment of the present disclosure further provides a storage medium, e.g., a non-transitory computer-readable medium, including computer-executable or computer-readable instructions that are used for, when executed by a computer processor, implementing a data transmission control method. The method includes the steps described below.

A multiple and a remainder are determined according to a total data size of to-be-transmitted data and a set byte size, where the multiple is equal to a quotient obtained by dividing the total data size by the set byte size, and the remainder is equal to a remainder obtained by dividing the total data size by the set byte size.

Data whose size is the set byte size multiplied by the multiple in the to-be-transmitted data is sequentially transmitted by transmitting data of the set byte size each time.

In response to the remainder being not zero, the remaining data whose size is the remainder in the to-be-transmitted data is transmitted.

Of course, in the storage medium including computer-executable instructions provided by the embodiment of the present disclosure, the computer-executable instructions can implement not only the above-mentioned method operations but also related operations in the data transmission control method provided by any one of the embodiments of the present disclosure.

From the description of the above-mentioned implementations, it will be apparent to those skilled in the art that the present disclosure may be implemented by means of software plus necessary general-purpose hardware, or may, of course, be implemented by hardware. However, in many cases, the former is a preferred implementation. Based on this understanding, the technical solutions provided by the present disclosure substantially, or the part contributing to the related art, may be embodied in the form of a software product. The software product may be stored in a computer-readable storage medium, such as a computer floppy disk, a read-only memory (ROM), a random access memory (RAM), a flash, a hard disk or an optical disk, and includes several instructions for enabling a computer device (which may be a personal computer, a server or a network device) to execute the methods provided by the embodiments of the present disclosure.

It is to be noted that units and modules involved in the embodiment of the above-mentioned device are just divided according to functional logic, and the division is not limited to this, as long as the corresponding functions can be implemented. In addition, the specific names of functional units are just intended to distinguish, and not to limit the scope of the present disclosure.

It is to be noted that the above are merely preferred embodiments of the present disclosure and the principles used therein. It will be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A data transmission control method, comprising:
   determining a multiple and a remainder according to a total data size of to-be-transmitted data and a set byte size, wherein the multiple is equal to a quotient obtained by dividing the total data size by the set byte size, and the remainder is equal to a remainder obtained by dividing the total data size by the set byte size;
   sequentially transmitting data whose size is the set byte size multiplied by the multiple in the to-be-transmitted data by transmitting data of the set byte size each time; and
   in response to the remainder being not zero, transmitting remaining data whose size is the remainder in the to-be-transmitted data;
   wherein before determining the multiple and the remainder according to the total data size of the to-be-transmitted data and the set byte size, the method further comprises:
   superimposing a to-be-superimposed picture to a background picture to synthesize a to-be-displayed picture, which comprises:
   judging a color value of each first pixel point in the to-be-superimposed picture in sequence;
   in response to a color value of a first pixel point being a set color value, replacing the color value of the first pixel point with a color value of a second pixel point, corresponding to a position of the first pixel point, in the background picture;
   in response to the color value of the first pixel point being not the set color value, retaining the color value of the first pixel point; and
   using the to-be-displayed picture as the to-be-transmitted data.

2. The data transmission control method of claim 1, wherein before determining the multiple and the remainder according to the total data size of the to-be-transmitted data and the set byte size, the method further comprises:
   determining the set byte size according to a protocol type of an input source of the to-be-transmitted data.

3. The data transmission control method of claim 1, wherein before sequentially transmitting the data whose size is the set byte size multiplied by the multiple in the to-be-transmitted data by transmitting the data of the set byte size each time, the method further comprises:
   setting a buffer whose size is the set byte size in a memory;
   connecting the buffer to a memory of a reception module through a direct memory access controller; and
   enabling a transmission interface;
   wherein accordingly, sequentially transmitting the data whose size is the set byte size multiplied by the multiple in the to-be-transmitted data by transmitting the data of the set byte size each time comprises:
   updating the buffer for times of the multiple in real time in a manner of sequentially storing data whose size is the set byte size multiplied by the multiple in the to-be-transmitted data into the buffer by copying the data of the set byte size to the buffer each time; and
   writing the data in buffer updated for times of the multiple into the memory of the reception module through the direct memory access controller by writing the data of the set byte size in the buffer into the memory of the reception module through the direct memory access controller each time; and
   wherein in response to the remainder being not zero, transmitting remaining data of the remainder in the to-be-transmitted data comprises:
   in response to the remainder being not zero, copying the remaining data whose size is the remainder in the to-be-transmitted data to the buffer; and
   writing the remaining data whose size is the remainder in the buffer into the memory of the reception module through the direct memory access controller.

4. The data transmission control method of claim 3, wherein writing the data in buffer updated for times of the multiple into the memory of the reception module through the direct memory access controller comprises:
   writing the data in buffer updated for times of the multiple into the memory of the reception module through the transmission interface by controlling of the direct memory access controller.

5. The data transmission control method of claim 3, wherein writing the data in buffer updated for times of the multiple into the memory of the reception module through the direct memory access controller comprises:
   sequentially writing the data in buffer updated each time into the memory of the reception module through the direct memory access controller.

6. The data transmission control method of claim 3, wherein the transmission interface comprises at least one of: a serial peripheral interface (SPI) or an inter-integrated circuit (I2C) bus.

7. The data transmission control method of claim 1, wherein before sequentially transmitting the data whose size is the set byte size multiplied by the multiple in the to-be-transmitted data by transmitting the data of the set byte size each time, the method further comprises:
   setting a buffer whose size is the set byte size in a memory;
   connecting the buffer to a memory of a reception module through a direct memory access controller; and
   wherein accordingly, sequentially transmitting the data whose size is the set byte size multiplied by the multiple in the to-be-transmitted data by transmitting the data of the set byte size each time comprises:
   updating the buffer for times of the multiple in real time in a manner of sequentially storing data whose size is the set byte size multiplied by the multiple in the to-be-transmitted data into the buffer by copying the data of the set byte size to the buffer each time; and
   writing the data in buffer updated for times of the multiple into the memory of the reception module through the direct memory access controller by writing the data of the set byte size in the buffer into the memory of the reception module through the direct memory access controller each time; and
   wherein in response to the remainder being not zero, transmitting remaining data of the remainder in the to-be-transmitted data comprises:
   in response to the remainder being not zero, copying the remaining data whose size is the remainder in the to-be-transmitted data to the buffer; and
   writing the remaining data whose size is the remainder in the buffer into the memory of the reception module through the direct memory access controller.

8. The data transmission control method of claim 1, wherein before sequentially transmitting the data whose size is the set byte size multiplied by the multiple in the to-betransmitted data by transmitting the data of the set byte size each time, the method further comprises:
   setting a buffer whose size is the set byte size in a memory;
   connecting the buffer to a memory of a reception module through a direct memory access controller; and
   enabling a transmission interface;
   wherein accordingly, sequentially transmitting the data whose size is the set byte size multiplied by the multiple in the to-be-transmitted data by transmitting the data of the set byte size each time comprises:
   updating the buffer for times of the multiple in real time in a manner of sequentially storing data whose size is the set byte size multiplied by the multiple in the to-be-transmitted data into the buffer by copying the data of the set byte size to the buffer each time; and
   writing the data in buffer updated for times of the multiple into the memory of the reception module through the direct memory access controller by writing the data of the set byte size in the buffer into the memory of the reception module through the direct memory access controller each time; and
   wherein in response to the remainder being not zero, transmitting remaining data of the remainder in the to-be-transmitted data comprises:
   in response to the remainder being not zero, copying the remaining data whose size is the remainder in the to-be-transmitted data to the buffer; and
   writing the remaining data whose size is the remainder in the buffer into the memory of the reception module through the direct memory access controller.

9. A data transmission control device, comprising:
a processor and a memory, wherein the memory is configured to store program instructions, and the processor is configured to, when executing the program instructions, perform the following steps:
determining a multiple and a remainder according to a total data size of to-be-transmitted data and a set byte size, wherein the multiple is equal to a quotient obtained by dividing the total data size by the set byte size, and the remainder is equal to a remainder obtained by dividing the total data size by the set byte size;
sequentially transmitting data whose size is the set byte size multiplied by the multiple in the to-be-transmitted data by transmitting data of the set byte size each time; and
in response to the remainder being not zero, transmitting remaining data whose size is the remainder in the to-be-transmitted data;
wherein the processor is further configured to perform, before determining the multiple and the remainder according to the total data size of the to-be-transmitted data and the set byte size, the following steps:
superimposing a to-be-superimposed picture to a background picture to synthesize a to-be-displayed picture, which comprises:
judging a color value of each first pixel point in the to-be-superimposed picture in sequence;
in response to a color value of a first pixel point being a set color value, replacing the color value of the first pixel point with a color value of a second pixel point, corresponding to a position of the first pixel point, in the background picture;
in response to the color value of the first pixel point being not the set color value, retaining the color value of the first pixel point; and
using the to-be-displayed picture as the to-be-transmitted data.

10. The data transmission control device of claim 9, wherein the processor is further configured to perform, before determining the multiple and the remainder according to the total data size of the to-be-transmitted data and the set byte size, the following step: determining the set byte size according to a protocol type of an input source of the to-be-transmitted data.

11. The data transmission control device of claim 9, wherein
   the processor is further configured to perform, before sequentially transmitting the data whose size is the set byte size multiplied by the multiple in the to-be-transmitted data by transmitting the data of the set byte size each time, the following steps:
   setting a buffer whose size is the set byte size in a memory;
   connecting the buffer to a memory of a reception module through a direct memory access controller; and
   enabling a transmission interface;
   the processor is configured to perform sequentially transmitting the data whose size is the set byte size multiplied by the multiple in the to-be-transmitted data by transmitting the data of the set byte size each time by:
   updating the buffer for times of the multiple in real time in a manner of sequentially storing data whose size is the set byte size multiplied by the multiple in the to-be-transmitted data into the buffer by copying the data of the set byte size to the buffer each time; and
   writing the data in buffer updated for times of the multiple into the memory of the reception module through the direct memory access controller by writing the data of the set byte size in the buffer into the memory of the reception module through the direct memory access controller each time; and
   the processor is configured to perform in response to the remainder being not zero, transmitting remaining data of the remainder in the to-be-transmitted data by:
   in response to the remainder being not zero, copying the remaining data whose size is the remainder in the to-be-transmitted data to the buffer; and
   writing the remaining data whose size is the remainder in the buffer into the memory of the reception module through the direct memory access controller.

12. The data transmission control device of claim 11, wherein the processor is configured to perform writing the data in buffer updated for times of the multiple into the memory of the reception module through the direct memory access controller by:
   writing the data in buffer updated for times of the multiple into the memory of the reception module through the transmission interface by the direct memory access controller.

13. The data transmission control device of claim 11, wherein the processor is configured to perform writing the data in buffer updated for times of the multiple into the memory of the reception module through the direct memory access controller by:
   sequentially writing the data in buffer updated each time into the memory of the reception module through the direct memory access controller.

14. The data transmission control device of claim 11, wherein the transmission interface comprises at least one of: a serial peripheral interface (SPI) or an inter-integrated circuit (I2C) bus.

15. The data transmission control device of claim 9, wherein the processor is further configured to perform, before sequentially transmitting the data whose size is the set byte size multiplied by the multiple in the to-be-transmitted data by transmitting the data of the set byte size each time, the following steps:

setting a buffer whose size is the set byte size in a memory;

connecting the buffer to a memory of a reception module through a direct memory access controller; and the processor is configured to perform sequentially transmitting the data whose size is the set byte size multiplied by the multiple in the to-be-transmitted data by transmitting the data of the set byte size each time by:

updating the buffer for times of the multiple in real time in a manner of sequentially storing data whose size is the set byte size multiplied by the multiple in the to-be-transmitted data into the buffer by copying the data of the set byte size to the buffer each time; and writing the data in buffer updated for times of the multiple into the memory of the reception module through the direct memory access controller by writing the data of the set byte size in the buffer into the memory of the reception module through the direct memory access controller each time; and the processor is configured to perform in response to the remainder being not zero, transmitting remaining data of the remainder in the to-be-transmitted data by:

in response to the remainder being not zero, copying the remaining data whose size is the remainder in the to-be-transmitted data to the buffer; and writing the remaining data whose size is the remainder in the buffer into the memory of the reception module through the direct memory access controller.

16. The data transmission control device of claim 15, wherein the processor is further configured to perform the following step:

enabling a transmission interface, wherein the transmission interface comprises at least one of: a serial peripheral interface (SPI) or an inter-integrated circuit (I2C) bus.

17. The data transmission control device of claim 9, wherein the processor is further configured to perform the following steps: setting a buffer whose size is the set byte size in a memory;

connecting the buffer to a memory of a reception module through a direct memory access controller; and enabling a transmission interface;

the processor is configured to perform sequentially transmitting the data whose size is the set byte size multiplied by the multiple in the to-be-transmitted data by transmitting the data of the set byte size each time by:

updating the buffer for times of the multiple in real time in a manner of sequentially storing data whose size is the set byte size multiplied by the multiple in the to-be-transmitted data into the buffer by copying the data of the set byte size to the buffer each time; and writing the data in buffer updated for times of the multiple into the memory of the reception module through the direct memory access controller by writing the data of the set byte size in the buffer into the memory of the reception module through the direct memory access controller each time; and the processor is configured to perform in response to the remainder being not zero, transmitting remaining data of the remainder in the to-be-transmitted data by:

in response to the remainder being not zero, copying the remaining data whose size is the remainder in the to-be-transmitted data to the buffer; and writing the remaining data whose size is the remainder in the buffer into the memory of the reception module through the direct memory access controller.

18. A non-transitory computer-readable medium having computer-readable instructions stored thereon that are executable by a processor to:

determine a multiple and a remainder according to a total data size of to-be-transmitted data and a set byte size, wherein the multiple is equal to a quotient obtained by dividing the total data size by the set byte size, and the remainder is equal to a remainder obtained by dividing the total data size by the set byte size;

sequentially transmit data whose size is the set byte size multiplied by the multiple in the to-be-transmitted data by transmitting data of the set byte size each time; and in response to the remainder being not zero, transmit remaining data whose size is the remainder in the to-be-transmitted data;

wherein the processor is further configured to perform, before determining the multiple and the remainder according to the total data size of the to-be-transmitted data and the set byte size, the following steps:

superimposing a to-be-superimposed picture to a background picture to synthesize a to-be-displayed picture, which comprises:

judging a color value of each first pixel point in the to-be-superimposed picture in sequence;

in response to a color value of a first pixel point being a set color value, replacing the color value of the first pixel point with a color value of a second pixel point, corresponding to a position of the first pixel point, in the background picture;

in response to the color value of the first pixel point being not the set color value, retaining the color value of the first pixel point; and using the to-be-displayed picture as the to-be-transmitted data.

* * * * *